(12) United States Patent
Sorenson, III

(10) Patent No.: US 9,020,902 B1
(45) Date of Patent: *Apr. 28, 2015

(54) REDUCING HEAD AND TAIL DUPLICATION IN STORED DATA

(71) Applicant: Amazon Technologies, Inc., Reno, NV (US)

(72) Inventor: James C. Sorenson, III, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/219,957

(22) Filed: Mar. 19, 2014

Related U.S. Application Data

(63) Continuation of application No. 13/359,436, filed on Jan. 26, 2012, now Pat. No. 8,706,695.

(51) Int. Cl.
  *G06F 17/30* (2006.01)
(52) U.S. Cl.
  CPC .................................. *G06F 17/3033* (2013.01)
(58) Field of Classification Search
  USPC ........................................................ 707/673
  See application file for complete search history.

(56) References Cited

U.S. PATENT DOCUMENTS

| | | | | |
|---|---|---|---|---|
| 6,507,847 | B1 * | 1/2003 | Fleischman .................... | 707/704 |
| 8,089,869 | B2 * | 1/2012 | Kisela et al. ................... | 370/229 |
| 8,239,188 | B2 * | 8/2012 | Liu .................................. | 704/4 |
| 8,239,686 | B1 * | 8/2012 | Hodzic et al. .................. | 713/187 |
| 8,280,860 | B2 * | 10/2012 | Spackman et al. ............ | 707/692 |
| 8,442,954 | B2 * | 5/2013 | Spackman ...................... | 707/692 |
| 2008/0029146 | A1 * | 2/2008 | Plissonnier et al. .......... | 136/242 |
| 2011/0022825 | A1 * | 1/2011 | Spackman ..................... | 712/240 |
| 2012/0124011 | A1 * | 5/2012 | Spackman et al. ............ | 707/692 |

OTHER PUBLICATIONS

"Erasure code," Wikipedia, URL=http://en.wikipedia.org/wiki/Erasure_coding, last modified on Jan. 9, 2012, download date Jun. 4, 2012, 5 pages.

Quantum Corporation, "Data Deduplication," URL=http://www.quantum.com/Solutions/datadeduplication/Index.aspx, download date Jun. 4, 2012, 3 pages.

Riverbed Technology, "Technology," URL=http://www.riverbed.com/us/products/technology/, download date Jun. 4, 2012, 3 pages.

(Continued)

*Primary Examiner* — Baoquoc N To
(74) *Attorney, Agent, or Firm* — Seed IP Law Group PLLC

(57) ABSTRACT

Techniques are described for managing data storage and retrieval, such as by generating a hash value for a beginning and/or ending portion of a new data group to be stored, attempting to match each generated hash value to a plurality of hash values associated with other existing data groups that are already stored, and comparing the new data group and an identified existing data group to determine any identical extended initial or final portion of the two data groups. The new data group may then be stored as the portion unique to the new data group, along with a reference to the existing identical extended portion of the existing data group. The new stored data group may be later retrieved using the unique portion of the data group, along with the existing extended portions corresponding to other stored data groups for any stored references.

34 Claims, 6 Drawing Sheets

(56) References Cited

OTHER PUBLICATIONS

Simha, "RPE: The Art of Data Deduplication," Department of Computer Science, Stony Brook University, Sep. 9, 2011, 52 pages.

Lu, Maohua, "Efficient Metadata Update Techniques for Storage Systems," Computer Science Department, Stony Brook University, Aug. 2010, 221 pages.

* cited by examiner

| tail hash value | stored data group location | stored data portion length | algorithm | ... |
|---|---|---|---|---|
| 30C1 ... | 290a | 1 MB | MD5 | |
| F2C7 ... | 290b | 1 MB | MD5 | |
| ⋮ | | | | |
| 82F9 ... | 290c | 5 MB | SHA-1 | |

REDUCING HEAD AND TAIL DUPLICATION IN STORED DATA

BACKGROUND

As the amount of information that is collected and used by individuals, organizations and other entities has grown, the use of data storage systems has correspondingly increased. Despite the availability of increasing amounts of storage capacity, it is nonetheless desirable at times to avoid storing multiple copies of identical information. Existing systems for reducing duplicative data storage have various problems, however, and in at least some situations involve using a large number of data storage locations on one or more storage devices to retrieve a single group of data, resulting in a high number of seek operations for such data retrieval.

DETAILED DESCRIPTION

Figure 1:
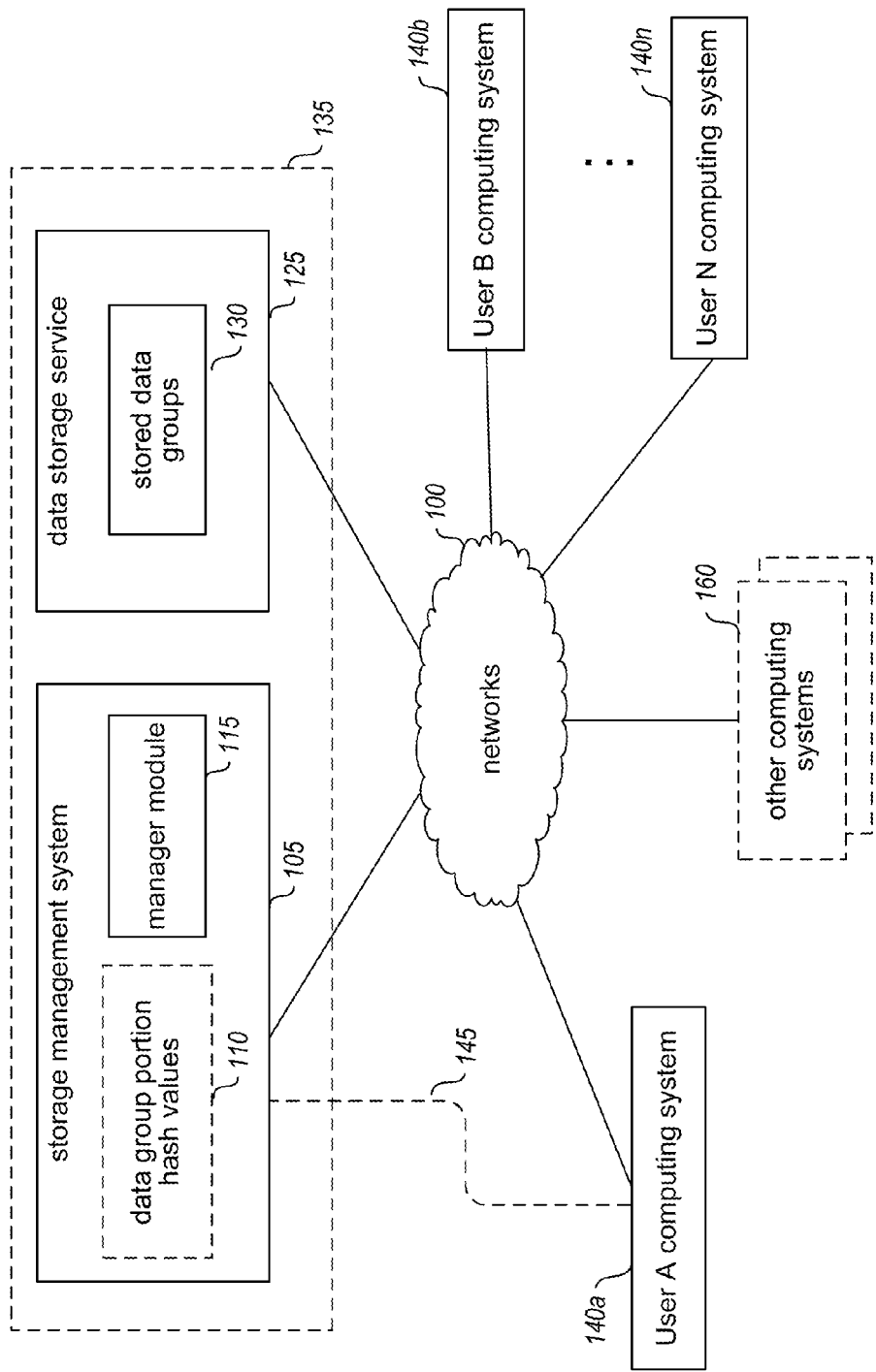
FIG. 1 illustrates an example embodiment of a storage management system that manages data storage by reducing head and/or tail duplication in stored data.

Techniques are described for managing the storage and retrieval of data on one or more storage devices in a manner that reduces duplication of at least some stored data. In particular, in at least some embodiments, the managing of the storage and retrieval of data is performed to reduce redundancy at the beginnings and/or endings of stored data, referred to generally herein as head redundancy and tail redundancy, respectively.

With respect to tail redundancy, the described techniques in at least some embodiments include receiving a new group of data to be stored on one or more storage devices, and identifying a subset of the data of that new data group at the end of the new data group that is identical to a corresponding ending subset of another existing data group that is already stored. In such cases, the storing of the new data group is then performed such that only one of the two ending data subsets is actually stored on the storage device(s), to reduce duplication of such identical ending data subsets.

In addition, with respect to head redundancy, the described techniques in at least some embodiments similarly include receiving a new group of data to be stored on one or more storage devices, and identifying a subset of the data of that new data group at the beginning of that new data group that is identical to a corresponding beginning data subset of another existing data group that is already stored. In such cases, the new data group is stored such that only one of the two beginning data subsets is actually stored on the storage device(s), to reduce duplication of such identical beginning data subsets. At least some of the described techniques are performed by automated operations of a storage management system, in some embodiments.

Thus, the described techniques may include identifying beginning and/or ending sequential data subsets of a new data group that match corresponding beginning and/or ending sequential data subsets of one or more existing data groups that are already stored. The process of identifying matching beginning data subsets to reduce head redundancy may be performed instead of or in addition to the process of identifying matching ending data subsets to reduce tail redundancy in some embodiments and some situations. In addition, in at least some embodiments in which both head and tail redundancy techniques are used, the beginning data subset of a new data group is matched to the beginning of a first existing stored data group while the ending data subset of the new data group is matched to the end of a distinct second existing stored data group.

The described techniques may be performed with one or more types of data groups in particular embodiments. For example, in some embodiments the techniques can be used with data sequences (e.g., files) or data objects that are received in various manners (e.g., downloaded completely before storing operations begin; received using streaming data operations, optionally with the storing operations beginning before all of the streamed data has been received; etc.).

The matching of a new sequential data subset for a new data group (whether at the beginning or end of the new data group) with one or more existing stored sequential data subsets of existing stored data groups is in at least some embodiments performed at least in part by matching computed hash values corresponding to at least some of the new and existing sequential data subsets. Such computed hash values are deterministic, in that a given input will cause the same output to be produced each time it is performed. In addition, the computed hash values may be of various types in various embodiments, including in some embodiments to not uniquely identify corresponding data portions (e.g., if there is a many-to-1 mapping of multiple distinct data portions to a single hash value, such as for checksum hash values), while in other embodiments the hash values may be treated as uniquely identifying corresponding data portions (e.g., if there is a 1-to-1 mapping of data portion to hash value, with a margin of error being at most some defined minimum, such as for cryptographic fingerprint hash values).

In addition, the process of matching a new sequential data subset for a new data group (whether at the beginning or end of the new data group) with one or more sequential data subsets of existing stored data groups can, in at least some embodiments, be performed by executing a sequential data value comparison (e.g., a bit-by-bit comparison) of at least some of the new and existing sequential data subsets to determine identical data sequences. The identical data sequences may in some embodiments include some or all of the data portions used to generate corresponding hash values, optionally with additional adjacent contiguous data. Additional details are included below related to matching of a new sequential data subset for a new data group with one or more existing stored sequential data subsets.

In an example embodiment, if a match is identified between a new sequential data subset for a new data group (whether at the beginning or end of the new data group) with an existing stored sequential data subset of an existing stored data group, the new data group is stored without including a copy of the matched new sequential data subset. In particular, in at least some such embodiments, a pointer or link or other reference can be stored in place of the new sequential data subset, with the stored reference indicating the location of the existing stored sequential data subset on one or more storage devices. If a new data group has both a matching beginning data subset and a matching ending data subset, the two such stored references can be stored for the new data group, one pointing to the corresponding existing stored sequential beginning data subset and the other to the corresponding existing stored sequential ending data subset.

In such embodiments, when the stored new data group is later retrieved, the parts of the new data group that were independently stored for the new data group on one or more storage devices (e.g., data that is unique for the new data group, relative to the existing stored data groups) are retrieved. These independently stored parts of the new data group include at least an intermediate part of the new data group that did not match any existing stored sequential beginning data subsets or any existing stored sequential ending data subsets. If the new data group was not identical in its entirety to an existing stored data group the independently stored parts of the new data group may optionally include one or both of the beginning and ending parts of the new data group, if no match was identified to existing stored sequential data subsets for the beginning and/or ending sequential data subsets of the new data group.

Continuing with the example, if the new data group includes one or two stored references, the new data group can be retrieved by using the stored reference(s) to identify the corresponding existing stored sequential data subset for each stored reference and construct the various retrieved data to form the new data group before it is provided. For example, if the stored new data group includes both a stored beginning reference for a beginning data subset of the new data group and a stored ending reference for an ending data subset of the new data group, the new data group may be retrieved by: first using the stored beginning reference to direct a read to the location of the corresponding existing stored sequential beginning data subset of a distinct existing stored data group, where that data is read; next directing a read to the location of the parts of the new data group that were independently stored for the new data group, where that data is read; and then using the stored ending reference to direct a read to the location of the corresponding existing stored sequential ending data subset of a distinct existing stored data group, where that data is read.

Additional details related to managing the storage and retrieval of data on one or more storage devices in a manner that reduces duplication of at least some stored data are included below, including with respect to FIGS. 2A-2E.

For illustrative purposes, some embodiments are described below in which specific instances of data storage management are provided in specific ways, including with respect to specific storage environments (e.g., an online data storage service that is accessible to users over one or more networks). These examples are provided for illustrative purposes and are simplified for the sake of brevity, and the inventive techniques can be used in a wide variety of other situations (e.g., as part of one or more storage devices attached to a single computer system), some of which are discussed below, and the techniques are not limited to use with particular types of data, storage or other devices, computing systems or computing system arrangements.

FIG. 1 is a network diagram that illustrates an example embodiment of a storage management system that manages data storage by avoiding head and/or ending redundancy in stored data. In particular, in the illustrated embodiment, an automated storage management system 105 is illustrated, and it is providing data storage functionality for an associated data storage service 125. Various users (not shown) of various user computing systems 140 interact over one or more networks 100 with the data storage service 125, which is provided by one or more other configured computing systems (not shown). In particular, the various data storage users use the user computing systems 140 to provide new data groups to be stored by the data storage service (e.g., on one or more non-volatile storage devices, not shown, of the data storage service), and/or to request that one or more existing stored data groups 130 be retrieved and provided to the data storage users.

In the illustrated embodiment, the storage management system 105 and data storage service 125 are integrated into a single system 135 (e.g., provided by a single entity, not shown), but in other embodiments may be implemented in other forms (e.g., being separate systems operated by separate entities, being a single system that includes at least some of the described functionality of both the storage management system and the data storage service, etc.). For example, the storage management system 105 may in other embodiments be connected to other computing systems 160 over the networks 100, with those other computing systems 160 implementing other network services that may utilize the storage management system 105 to manage the storage of data on behalf of those other network services. Similarly, in other embodiments, one of the data storage users 140a may optionally interact directly 145 with the storage management system 105 so that the storage management system 105 manages storage and retrieval of data on one or more non-volatile storage devices (not shown) that are part of or otherwise attached locally to the computing system 140a, with the interactions 145 optionally occurring over network 100 or instead by having some or all of the storage management system 105 execute locally on the computing system 140a.

In this example of FIG. 1, the storage management system 105 includes a storage manager module 115 that performs functionality to implement at least some of the described techniques, optionally in conjunction with one or more other modules (not shown) of the data storage service 125. In particular, the storage management system 105 receives information about a new data group to be stored (e.g., from the data storage service, based on a data group supplied by one of the user computing systems 140), and generates a hash value for each of a beginning sequential data portion of the new data group and/or an ending sequential data portion of the new data group. The storage management system 105 then compares each generated hash value to a group of stored hash values 110 that correspond to existing data groups 130 stored by the data storage service 125 (e.g., by comparing a generated beginning hash value for the beginning sequential data portion of the new data group to a corresponding subset of beginning hash values of the hash values 110, and by comparing a generated ending hash value for the ending sequential data portion of the new data group to a corresponding subset of ending hash values of the hash values 110). In other embodiments, either or both of the data group portion hash values 110 and the stored data groups 130 may be stored elsewhere, such as for the hash values 110 to be stored within the data storage service 125 in at least some embodiments.

For each generated hash value for the new data group, if the generated hash value matches one of the hash values 110, the existing stored data group 130 and sequential data portion of that existing stored data group corresponding to the matched hash value is identified. The storage management system 105 then performs a sequential data value comparison (e.g., a bit-by-bit comparison) of at least some of the new sequential data portion corresponding to the generated hash value and of the identified existing sequential data portion, to identify a contiguous data subset of each of the new and existing data groups that are identical. If all of the new and existing sequential data portions corresponding to the hash values are identical, the sequential data value comparison may continue beyond the new and existing sequential data portions until non-identical data is identified, with the resulting identical sequential data subsets for the new and existing data groups being an extended sequential portion of the new and existing data groups. An example with additional details of generating hash values and matching sequential data subsets are included with respect to FIGS. 2A-2E.

After zero or one or two sequential data subsets at the beginning and/or ending of the new data group are matched to identical sequential data subsets of one or two existing stored data groups, the new data group is stored by the data storage service as one of the stored data groups 130, with a stored reference for each matching sequential data subset of the new data group, and with independent parts of the new data group that are not part of any such matching sequential data subsets being separately stored for the new data group. In addition, if one or both generated hash values for the new data group did not match any existing hash values 110, those generated hash values may be stored as part of the existing hash values 110 along with an indication of the associated data portion of the independently stored parts of the new data group, to enable later storage of other new data groups to potentially match data portions of the stored new data group. In addition, if the stored new data group is later retrieved, the independently stored parts of the new data group will be retrieved, and for each stored reference associated with the stored new data group, the corresponding sequential data subset of another existing stored data group is retrieved and combined with the independently stored parts in order to reconstruct the new data group.

The networks 100 of FIG. 1 may include any appropriate network or combination of networks, including an intranet, the Internet, one or more private networks with access to and/or from the Internet, a cellular network, a local area network, or any other such network or combination thereof. Communication over the networks may be enabled by wired or wireless connections and combinations thereof. In the illustrated embodiment, the storage manager module 115 (and any other modules, not shown) may include software instructions that execute on one or more computing systems (not shown) to program or otherwise configure those computing systems to perform some or all of the described techniques, and the systems that include those modules similarly may include those software instructions and optionally other software instructions. In addition, the modules and systems may be provided in various manners, such as at a single data center or otherwise to use a group of co-located computing systems, or instead in a distributed manner using various computing systems in various distinct geographical locations. Furthermore, the storage management system 105 and the data storage service 125 may include multiple physical computing systems and/or multiple virtual machines that are hosted on one or more physical computing systems.

Although the foregoing example embodiment of FIG. 1 is described with respect to a storage management system that provides various types of functionality for various users in conjunction with an associated data storage service, it will be appreciated that various other embodiments may exist. For example, in at least some embodiments and situations, some users or other entities may serve multiple roles, and some of the users may represent an organization or other group (e.g., a company) instead of an individual. In certain embodiments, one or both of the storage management system 105 and data storage service 125 may operate according to one or more fee-based structures or agreements. For example, access to some or all of the described techniques may in some embodiments be provided in a fee-based or other paid manner to at least some users. As one example, users may pay one-time fees, periodic (e.g., monthly) fees and/or one or more types of usage-based fees to use the storage management system and/or data storage service to store and access files or other data groups. Fees may be based on one or more factors and activities, such as indicated in the following non-exclusive list: based on the quantity of data to be stored, such as to initially store the data (e.g., as a one-time fee), to maintain ongoing storage and/or retrieval access to the data (e.g., a monthly fee), etc.; based on usage of the data, such as a number of data transfers in a particular period of time; based on content or other characteristics of the particular data groups to be stored and/or retrieved (e.g., media content versus textual content); based on a manner in which the data is transferred (e.g., network bandwidth resources consumed by the initial or subsequent transfers of the data, number of computing systems to or from which the data is transferred, etc.); etc. Furthermore, in at least some embodiments and situations, a first group of one or more users may provide data to other users on a fee-based basis, such as to charge the other users for receiving access to data initially stored by one or more users of the first group, whether as a one-time purchase fee, an ongoing rental fee, another ongoing subscription basis, or any other appropriate fee arrangement.

Figure 2A:
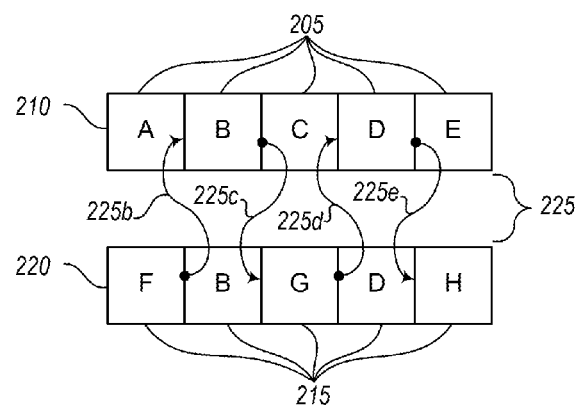
FIGS. 2A-2E illustrate examples of managing the storage and/or retrieval of one or more data groups.

FIG. 2A illustrates an example of a block-based data de-duplication storage scheme. A stored data group 210 consists of five data blocks 205 in this example, the contents of which may be sequentially and respectively referred to as data blocks A, B, C, D and E. A new data group 220 to be stored also consists of five data blocks 215, the contents of which may be sequentially and respectively referred to as data blocks F, B, G, D and H. For purposes of the illustrated embodiment, it may be assumed that each of the data blocks 205 and 215 are of equal length, but such equality is not necessary, and that blocks with the same names contain the same data (e.g., block B of data group 210 is the same as block B of data group 220, and block D of data group 210 is the same as block D of data group 220). Due to the duplication of blocks B and D, new data group 220 may be stored as a combination of data blocks that are unique to the new data group 220 (i.e., data blocks F, G and H), along with information about those other data blocks B and D already stored as part of stored data group 210. However, the storage scheme of FIG. 2A is limited to detecting (and redundantly storing) identical blocks. If, for example, portions of stored data group 210 and new data group 220 contained identical content, but such content could not be delineated as separate data blocks, the identical content would still be redundantly stored. Furthermore, when retrieving a data group stored using the storage scheme illustrated in FIG. 2A, a separate seek operation would be used to retrieve the contents of each block separately referenced as part of that stored data group. For example, consider a situation in which blocks A, B, C, D and E of data group 210 are stored consecutively at one location of a disk drive storage device, and in which blocks F, G and H of data group 220 are stored elsewhere on that storage device. In that situation, the read operation for data group 220 would begin at the disk storage location of block F. After reading block F, the disk drive read head would be moved in a seek operation to the beginning of block B of data group 210, as shown abstractly using indicator 225b. After reading block B, the disk drive read head would be moved in another seek operation to the beginning of block G of data group 220, as shown abstractly using indicator 225c. After reading block G, the disk drive read head would be moved in another seek operation to the beginning of block D of data group 210, as shown abstractly using indicator 225d. Finally, after reading block D, the disk drive read head would be moved in another seek operation to the beginning of block H of data group 220, as shown abstractly using indicator 225e, to finish reading block H. Thus, even in this simplistic example, at least 4 seek operations are performed, which can be very time consuming.

Figure 2B:
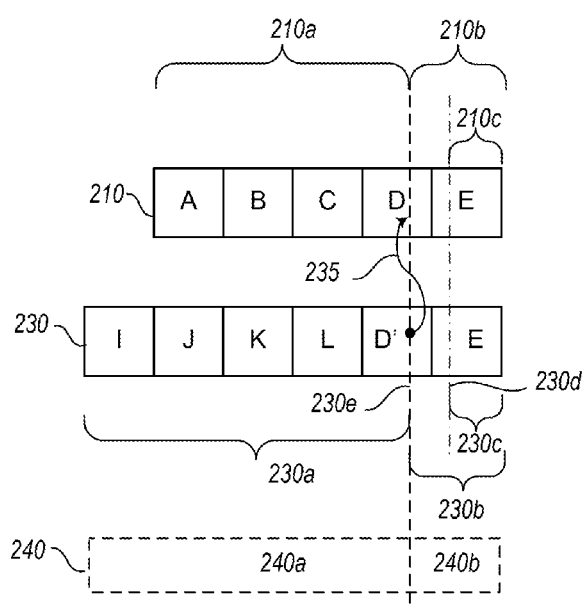
Figure 2C:
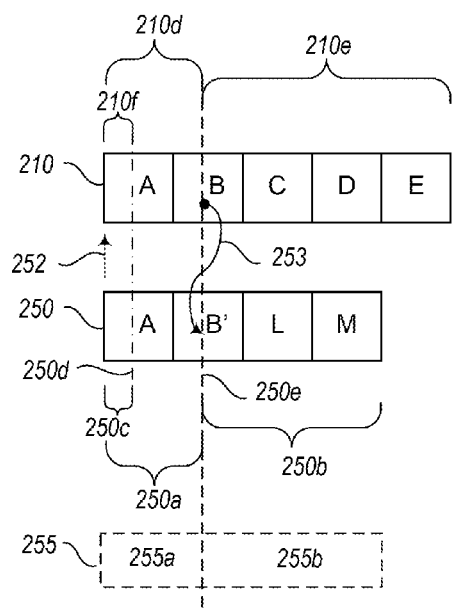
Figures 2D, 2E:
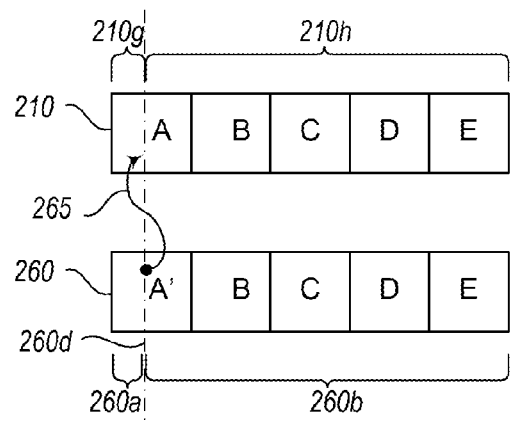

FIGS. 2B-2D illustrate examples of the alternative storage and retrieval operations performed for particular example data groups in accordance with certain embodiments as described herein. In the example of FIG. 2B, a new data group 230 is being stored, and an ending portion of the new data group 230 is identified as being duplicative with an ending portion of the existing stored data group. As in FIG. 2A, stored data group 210 may be described as containing contents that may be sequentially and respectively referred to as data blocks A, B, C, D and E. For convenience, new data group 230 is depicted and may be described as containing contents that may be sequentially and respectively referred to as data blocks I, J, K, K, D' and E, with block E of data group 230 being identical to block E of data group 210. an embodiment is illustrated in which ending hash value matching is utilized to avoid redundantly storing a final data sequence of new data group 230 that is identical to a corresponding final data sequence of stored data group 210.

In the illustrated example of FIG. 2B, stored data group 210 is illustrated as including an initial section 210a and a final section 210b, with final section 210b including an end data portion 210c of a predetermined length. A ending hash value (not shown) is generated for existing stored data group 210 based on the contents of end data portion 210c, and is associated with the stored data group 210 (e.g., in a manner similar to the hash values 110 of FIG. 1). New data group 230 similarly includes an initial section 230a and a final section 230b, with final section 230b including an end data portion 230c of the same predetermined length as end data portion 210c of stored data group 210. In the illustrated embodiment, the contents of final data sequence subsets 210b and 230b are identical between stored data group 210 and new data group 230, including the contents of end data portions 210c and 230c.

In the illustrated embodiment, upon receiving the new data group 230, an embodiment of the storage management system generates a ending hash value (not shown) based on the contents of end data portion 230c, and attempts to match the generated ending hash value to stored ending hash values corresponding to existing stored data groups. Because the contents of end data portions 210c and 230c are identical, the ending hash values based upon those contents are also identical, and the storage management system matches the generated ending hash value for new data group 230 to the stored ending hash value for stored data group 210.

As a result of identifying such a match, the storage management system 105 initiates a comparison of the ending data sequence subsets of stored data group 210 and new data group 230 that match, which in this example includes all of the end data portions 210c and 230c, as well as a contiguous adjacent portion of stored data group 210 and new data group 230 that precede end data portions 210c and 230c In this example, the sequence of data in the ending data subsets 210b and 230b are identified as being identical based on sequential data comparison. In the illustrated embodiment, as a result of that comparison, the storage management system determines that an extended data sequence comprising the contents of final portion 230b in new data group 230 is identical to the extended sequence comprising the contents of final portion 210b in stored data group 210. The storage management system 105 then stores new data group 230 by independently storing the initial section 230a for data group 230, and by also storing a reference 235 associated with the new data group 230 and with the final portion 210b of stored data group 210—the stored reference 235 may contain, for example, an indication of the storage location of the final portion 210b of stored data group 210 and the length of the final portion 210b.

In order to fulfill a later request to retrieve data group 230 after it has been stored in this manner (for example, to provide the data group in order to fulfill one or more requests from the users of computing systems 140 of FIG. 1), the storage management system 105 may retrieve initial portion 230a of data group 230, and use the stored reference 235 associated with the data group 230 to retrieve final portion 210b of stored data group 210, optionally combining the initial portion 230a with final portion 210b, and provide the combined portions as data group 230.

While new data group 230 is illustrated as being stored using particular blocks, it will be appreciated that other types of data storage schemes may be used in an analogous manner. For example, as illustrated with respect to example new data group 240, it may be received and/or stored in a manner without individual blocks (e.g., in a streaming manner)—nonetheless, an ending sequence 240b of new data group 240 may similarly be matched to ending data sequence 210b of existing stored data group 210 (optionally by using an ending hash generated for an ending data portion of new data group 240, not shown, of the same length as that of ending data portion 210c). Thus, new data group 240 may similarly be stored by independently storing the initial data portion 240a of new data group 240, along with an associated stored reference similar to that of reference 235.

Referring to FIG. 2C, an example is illustrated in which beginning hash value matching is utilized to avoid redundantly storing an initial data sequence of new data group 250 that is identical to a corresponding initial data sequence of stored data group 210. As discussed above with respect to FIGS. 2A-2B, stored data group 210 may be described as containing contents sequentially and respectively referred to as data blocks A, B, C, D and E. For convenience, new data group 250 is depicted and may be described as containing contents that may be sequentially and respectively referred to as data blocks A, B', L and M, with block A of data group 250 being identical to block A of data group 210.

In the example of FIG. 2C, stored data group 210 includes an initial section 210d and a final section 210e, with initial section 210d including an initial data portion 210f of a predetermined length. A beginning hash value (not shown), generated based on the contents of initial data portion 210f, is associated with the stored data group 210. New data group 250 similarly includes an initial section 250a and a final section 250b, with initial section 250a including an initial data portion 250c of the same predetermined length as beginning data portion 210f of stored data group 210. In the illustrated embodiment, the contents of initial data sequence subsets 210d and 250a (and consequently, the contents of beginning data portions 210f and 250c) are identical between stored data group 210 and new data group 250.

Upon receiving the new data group 250, the storage management system generates a beginning hash value (not shown) based on the contents of beginning data portion 250c, and attempts to match the generated beginning hash value to stored beginning hash values corresponding to existing stored data groups. Because the contents of beginning data portions 210f and 250c are identical, the storage management system matches the generated beginning hash value for new data group 250 to the stored beginning hash value for stored data group 210. As a result of identifying such a match, the storage management system 105 initiates a comparison of the beginning data sequence subsets of stored data group 210 and new data group 250 that match, which in this example includes all of the beginning data portions 210f and 250c, as well as a contiguous adjacent portion of stored data group 210 and new data group 250 that follows subsequent to beginning data portions 210f and 250c In this example, the sequence of data in the beginning data subsets 210d and 250a are identified as being identical based on sequential data comparison. In the illustrated embodiment, as a result of that comparison, the storage management system 105 determines that an extended data sequence comprising the contents of initial portion 250a in new data group 250 is identical to the extended data sequence comprising the contents of initial data portion 210d in stored data group 210. The storage management system 105 then stores new data group 250 by, for example, independently storing final portion 250b, and by also storing a reference 252 associated with the new data group 250. The stored reference 252 may contain, for example, an indication of the location and length of the initial portion 210d of stored data group 210, such that later retrieval of the new data group 250 begins with the initial portion of stored data group 210. For example, the storage management system may include the reference 252 in header information associated with the data group 250.

In order to fulfill a later request to retrieve data group 250 after it has been stored in this manner (for example, to provide the data group in order to fulfill one or more requests from the users of computing systems 140 of FIG. 1), the storage management system 105 may use the stored reference 252 associated with the data group 250 to retrieve initial portion 210d of stored data group 210 (for example, by moving a disk drive read head in a first seek operation to the start of initial portion 210d), and then retrieve final portion 250b of data group 250 (for example, by moving a disk drive read head in a second seek operation to the beginning of final portion 250b, as shown using indicator 253), optionally combining the initial portion 210d with final portion 250b, and provide the combined portions as data group 250.

As similarly discussed with respect to new data group 230 in FIG. 2B, although new data group 250 is illustrated as being stored using particular blocks, it will be appreciated that other types of data storage schemes may be used in an analogous manner. For example, as illustrated with respect to example new data group 255, it may be received and/or stored in a manner without individual blocks (e.g., in a streaming manner)—nonetheless, an initial section 255a of new data group 255 may similarly be matched to initial section 210d of existing stored data group 210. Thus, new data group 255 may similarly be stored by independently storing an associated reference similar to that of reference 252 (referencing initial section 210d of existing stored data group 210), along with the ending portion 255b of new data group 255.

While in some embodiments only one of ending hash values and beginning hash values may be used, as illustrated in FIGS. 2B and 2C respectively, in other embodiments both ending hash values and beginning hash values may be used concurrently. Thus, if an additional new data group was received that began with blocks A and B' in a manner similar to FIG. 2C, and that ended in blocks D' and E in a manner similar to FIG. 2B, with an intermediate section of data between those block groups, the storage of such an additional new data group would include a reference similar to reference 255 to use beginning data sequence subset 210d of existing data group 210, a reference similar to reference 235 to use ending data sequence subset 210b of existing data group 210, and would independently store the intermediate section of data.

Thus, as illustrated in FIGS. 2B and 2C, when the storage management system 105 matches computed hash values corresponding to sequential data subsets for new and existing data groups, the storage management system 105 may, in some embodiments, select a sequential portion of data at the beginning and/or at the ending of a new data group to be stored, optionally of a predetermined length (with the predetermined lengths for the beginning and ending data portions being the same or being distinct). A hash value is then generated for each such selected data portion of the new data group. If a hash value is generated for a beginning data portion of the new data group (also referred to as a "head" data portion, with the generated hash value also being referred to as a "head" hash value), it is then matched to other head hash values generated for corresponding beginning data portions of each of other existing data groups that are already stored. Similarly, if a hash value is generated for an ending data portion of the new data group (also referred to as a "tail" data portion, with the generated hash value also being referred to as a "tail" hash value), it is then matched to other tail hash values generated for corresponding ending data portions of each of other existing data groups that are already stored.

If the generated hash values being used do not uniquely identify corresponding data portions (e.g., the hash values are many-to-1), then a detected match between a new data portion and an existing data portion indicates that the new and existing data portions are only possibly the same, and a sequential data value comparison is subsequently performed to determine whether some or all of the new and existing data portions are identical. If all of the new and existing data portions are identical, the sequential data value comparison may continue to identify an extended data sequence that is matching by comparing adjacent contiguous data. Alternatively, even if the generated hash values being used do uniquely identify corresponding data portions (e.g., are a 1-to-1 hash, within a defined error margin), such that a detected match between a new data portion and an existing data portion indicates that the new and existing data portions will be treated as identical, a sequential data value comparison may be subsequently performed to determine whether identical subsets of data for the new data group and the existing data group include additional adjacent sequences of data that extend beyond the new and existing data portions. Additional details related to matching of hash values are included below, including with respect to FIG. 2.

When performing a sequential data value comparison of at least some of new and existing sequential data subsets of new and existing data groups, the described techniques may in some embodiments include comparing data values of the new and existing data groups to identify an identical contiguous portion at the beginning or the end of each of two data groups being compared. For example, for the beginning of the new data group and existing data group, the comparison may include identifying contiguous beginning sequences of data that are identical in the new data group and existing data group—such identical data sequences may be longer than or shorter than the data portions used to generate the hash values. Furthermore, as noted above, if the generated hash values being used do uniquely identify corresponding data portions, the sequential data value comparison may begin at the end of the matching beginning data portions, rather than at the beginning of the data group. The sequential data value comparison for ending sequences of data that are identical in the new data group and existing data group is performed in an analogous manner.

Referring to FIG. 2D, an example is illustrated in which tail hash value matching is employed to avoid redundantly storing the significant majority of a new data group 260. Stored data group 210 in this example includes an initial data sequence subset 210g (which in this example is a header of a file), and a remaining data sequence subset 210 (which in this example is the body contents portion of the file). A tail hash value (not shown) based on the contents of an end portion of predetermined length (not shown) of stored data group 210 is associated with stored data group 210. New data group 260 includes a header portion 260a and a body portion 260b, structured in blocks which for convenience are sequentially referred to as data blocks A', B, C, D and E. The contents of body portions 210h and 260b are identical in this example, such that new data group 260 and stored data group 210 are identical with the exception of the header portions 260a and 210g. Upon receiving the new data group 260, the storage management system generates a tail hash value based on the contents of an end portion of predetermined length (not shown) of the new data group 260, and because the contents of body portions 210h and 260b are identical, matches the generated tail hash value with the tail hash value associated with stored data group 210. In the illustrated embodiment, after comparing the portions of stored data group 210 and new data group 260 preceding the end portions (on which the respective tail hash values are based), the storage management system determines that new data group 260 may be stored as header portion 260a, with an associated stored reference 265 indicating a location and length of the body portion 210h of stored data group 210. In this manner, of the contents of new data group 260, only the header portion 260a may need to be stored directly.

FIG. 2E illustrates a lookup table 270 for storing tail hash values in accordance with a particular embodiment, such as to reflect an example of the stored hash values 110 of FIG. 1. Each of the entries 280 within the lookup table in this example includes a hash value within data field 281a, an indicated storage device location within data field 281b corresponding to the existing stored data group and its ending data portion with which the hash value is associated, (optionally) a length within data field 281c of the data portion from which the hash value was generated, and (also optionally) an identifier within data field 281d corresponding to an algorithm used to generate the hash value. In some embodiments, all of the hash values contained within the lookup table 270 may have an identical predetermined length, and if so, the lookup table may not contain a separate field for the stored data portion length. Similarly, in some embodiments, all of the hash values contained within the lookup table 270 may be generated using a single algorithm, and if so, the lookup table may not contain a separate field for the algorithm type. In the illustrated embodiment, the lookup table 270 contains entries 280 having stored data portion lengths of both 1 megabyte and 5 megabytes, such as to correspond to different types of stored data groups. The hash value lookup table may contain additional fields and store other types of data in association with hash values in other embodiments. For example, in certain embodiments, the hash value lookup table may contain both tail hash values and head hash values, and entries within the lookup table in such embodiments may also contain an indicator of whether the listed hash value is for a head hash value or a tail hash value. In other embodiments, not head hash values may be used, or a separate table may be used to store information for head hash values in an analogous manner.

It will be appreciated that the examples of FIGS. 2A-2E are provided for illustrative purposes, and that the invention is not limited by the details discussed with respect to those examples.

Thus, a storage management system implemented in accordance with at least one embodiment may manage the storage of a plurality of data groups on one or more storage devices, such as may be part of a data storage service implemented in conjunction with or separately from the storage management system. Each of the stored data groups is associated with a head hash value generated based upon the contents of an initial portion of predetermined length, with a tail hash value generated based upon the contents of a final portion of predetermined length, or both. For example, in certain embodiments, a head hash value may be generated based upon the contents of the first 500 kilobytes (k) of a particular data group, or of each data group stored by the storage management system. In certain embodiments, a tail hash value may be similarly generated based upon the contents of the last 500 k of a particular data group, or of each data group stored by the storage management system.

If only a match for the head hash value of the new data group is identified, the storage management system may store the new data group by (a) storing and associating with the new data group a reference to a location of a matching beginning extended sequence of a first existing stored data group, determined as being identical to the corresponding portion of the new data group, and (b) storing any portion of the new data group subsequent to that beginning extended sequence. If only a match for the tail hash value of the new data group is identified, the storage management system 105 may store the new data group by (a) storing and associating with the new data group a reference to a location of a matching ending extended sequence of a second existing stored data group, determined as being identical to the corresponding portion of the new data group, and (b) storing any portion of the new data group preceding that ending extended sequence.

If matches for both the head hash value and the tail hash value of the new data group are identified, the storage management system may store the new data group by (a) storing and associating with the new data group a reference to a location of the beginning extended sequence of the first stored data group; (b) storing and associating with the new data group a reference to a location of the ending extended sequence of the second stored data group; and (c) storing any portion of the new data group occurring between the beginning and ending extended data sequences.

If no match was identified for either the head or tail hash values of the new data group, then the storage management system may store the entirety of the new data group without referencing any existing data group. In certain embodiments, the storage management system 105 may store for future use some or all generated hash values for the new data group as part of a routine for storing the new data group. In other embodiments, the storage management system 105 may store for future use the generated hash values at some other time or not at all, such as in embodiments in which such functionality is performed by a separate data storage service or other service.

Retrieval of an indicated data group may necessitate a different number of seek operations depending on whether the indicated data group was originally stored using various combinations of head hash value matching and tail hash value matching. If the indicated data group was stored using only head hash value matching, for example, retrieving the indicated data group may necessitate at most two seek operations, e.g., one seek operation to retrieve the initial extended data sequence referenced from another existing data group, and another seek operation to retrieve the independently stored subsequent portion of the indicated data group. As another example, if the indicated data group was stored using only tail hash value matching, retrieving the indicated data group may again necessitate at most two seek operations, e.g., one seek operation to retrieve the initial independently stored portion of the indicated data group, and another seek operation to retrieve the final extended data sequence referenced from another existing stored data group. If, however, the indicated data group was stored using both head and tail hash value matching, at most three seek operations may be needed, by combining the two techniques discussed above.

In some embodiments, the storage management system 105 may dynamically select whether to utilize head and/or tail hash values based upon a variety of criteria. Such criteria may include, for example, available resources of the storage management system 105; available resources of an associated data storage service 125 or services; the nature of the data groups being stored or of those to be stored; configuration parameters provided by one or more remote users or entities on whose behalf the data groups are stored; information that indicates that the customer associated with the data groups being stored has signed up for a data deduplication service; or various other criteria. In certain embodiments, for example, the storage management system 105 may recognize one or more new data groups to be stored as media content, and in particular media content encoded using a file format in which header information may vary significantly depending upon the particular originating computer system used to create the file, but in which the majority of the content subsequent to that header information may be identical to other copies of the same media content. In such a situation, the storage management system 105 may dynamically determine to utilize tail hash value matching, reflecting a higher likelihood that an extended sequence of the new media content may match a corresponding sequence of media content previously stored by the storage management system. As a contrasting example, the storage management system 105 may recognize one or more new data groups to be stored as large text documents, in which one or more authors are likely to have inserted additional content within the central portions. In such circumstances, the storage management system 105 may dynamically determine to utilize both head and tail hash value matching, reflecting the likelihood that the new document data groups may share significant initial and final content with portions of other document data groups previously stored by the storage management system.

In addition, in certain embodiments, the utilization of head hash values and/or tail hash values may be at least partially based on the manner in which new data groups are received. For example, in certain embodiments new data groups may be received by various methods of data streaming. In some of these embodiments, it may be desirable to generate head hash values for purposes of matching new data groups to stored data groups (such as by generating a head hash value based on the contents of one or more data buffers) prior to the storage management system 105 having received the entirety of the new data group to be stored. In other embodiments in which data groups are received via streaming, the storage management system 105 may determine to store the entirety of a streamed data group prior to generating a hash value based on the new data group in order to utilize tail hash value matching.

In various embodiments, different types of hash values may be used by the storage management system 105 to match new data groups with stored data groups. The hash values may not necessarily need to be unique, and in certain embodiments simple checksum functions may be utilized to create the hash values. In other embodiments, the hash values may be generated as the result of one or more fingerprint algorithms, cryptographic hash functions such as SHA-1 or MD5, or any other appropriate function or algorithm. In addition, various data group portions may be determined as the basis for the generation of the hash values. For example, in certain embodiments, all head hash values may be generated from data group portions of a first predetermined length, and all tail hash values may be generated from data group portions of a second distinct predetermined length. In other embodiments, head and tail hash values may be generated using data group portions of the same length. In certain embodiments, the length of the data portion to be used to generate hash values may be predetermined for all data groups, while in other embodiments the length of such data portions may be dynamically determined (such as based on the type of content of the data group, the size of the data group or collection of data groups, the quantity of data groups to which hash values generated based on a new data group may be compared, etc.).

Additionally, in certain embodiments, multiple head hash values or tail hash values may be generated using the same data group. For example, multiple data portions of a new data group, each having a distinct predetermined length and occurring at the beginning of the new data group, may be used to generate multiple head hash values for the new data group. In these embodiments, the new data group may be stored by attempting to match the head hash value corresponding to the longest data portion (i.e., of the greatest predetermined length) to the hash values already stored, in order to identify the longest matching extended data sequence already stored. As one example, a first portion of a new data group to be stored, consisting of the beginning 5 MB of the new data group, may be used to generate a first head hash value; and a second portion of the new data group, consisting of the beginning 1 MB, may be used to generate a second head hash value. If an attempt to match the first head hash value to one of the hash values already stored is successful, no attempt to match the second head hash value may be performed. However, if an attempt to match the first head hash value to those hash values already stored is unsuccessful, indicating that none of the stored data groups includes a beginning data portion that matches the first 5 MB of the new data group, an attempt may be made to match the second head hash value with one of those hash values already stored.

In a similar manner, multiple data portions occurring at the end of a new data group, each having a distinct predetermined length, may be used to generate multiple tail hash values for the new data group in certain embodiments, whether instead of or in addition to having multiple head hash values based on multiple head data portions. In such an instance, the storing of the new data group may include successive attempts to match the tail hash value corresponding to the data portion having the greatest predetermined length to a tail hash value already stored, in a manner analogous to that discussed above with respect to multiple head hash values.

In addition, in certain embodiments, various methods may be used for performing a sequential data comparison between a portion of a new data group to be stored and a portion of a stored data group identified as a match based upon the hash values associated with those data groups. For example, in some embodiments a bitwise comparison may be used. In other embodiments, a comparison may be performed between successive groups of data of a larger size (e.g., a byte, 100 bytes, 1000 bytes, etc.), such as by using a cryptographic hash for each successive group, such that a match between two such hash values is treated as confirming that the corresponding groups are identical. In at least some embodiments, only a portion of the data groups to be compared may be analyzed once a match between hash values has been identified, such as by progressively comparing bytes or blocks of data adjacent to those portions of the data groups used to generate the matched hash values, and halting such progressive comparison once a byte or block of the new data group has been determined to differ from the corresponding byte or block of the stored data group. In other embodiments, once a match between hash values has been identified, the entirety of the new and stored data groups is compared.

In addition, the described techniques may be used with a wide variety of types of storage in various embodiments, including storage that uses linear seek technology, or in which it is otherwise beneficial to reduce a number of seeks when retrieving data. A non-exclusive list of examples of types of storage that may be used includes the following: a hard disk drive; magnetic tape drive; non-volatile flash memory (e.g., NAND type flash memory or NOR type flash memory), including in one or more memory cards, USB flash drives or keys, solid-state drives, etc.; optical disk drive; etc.

Figure 3:
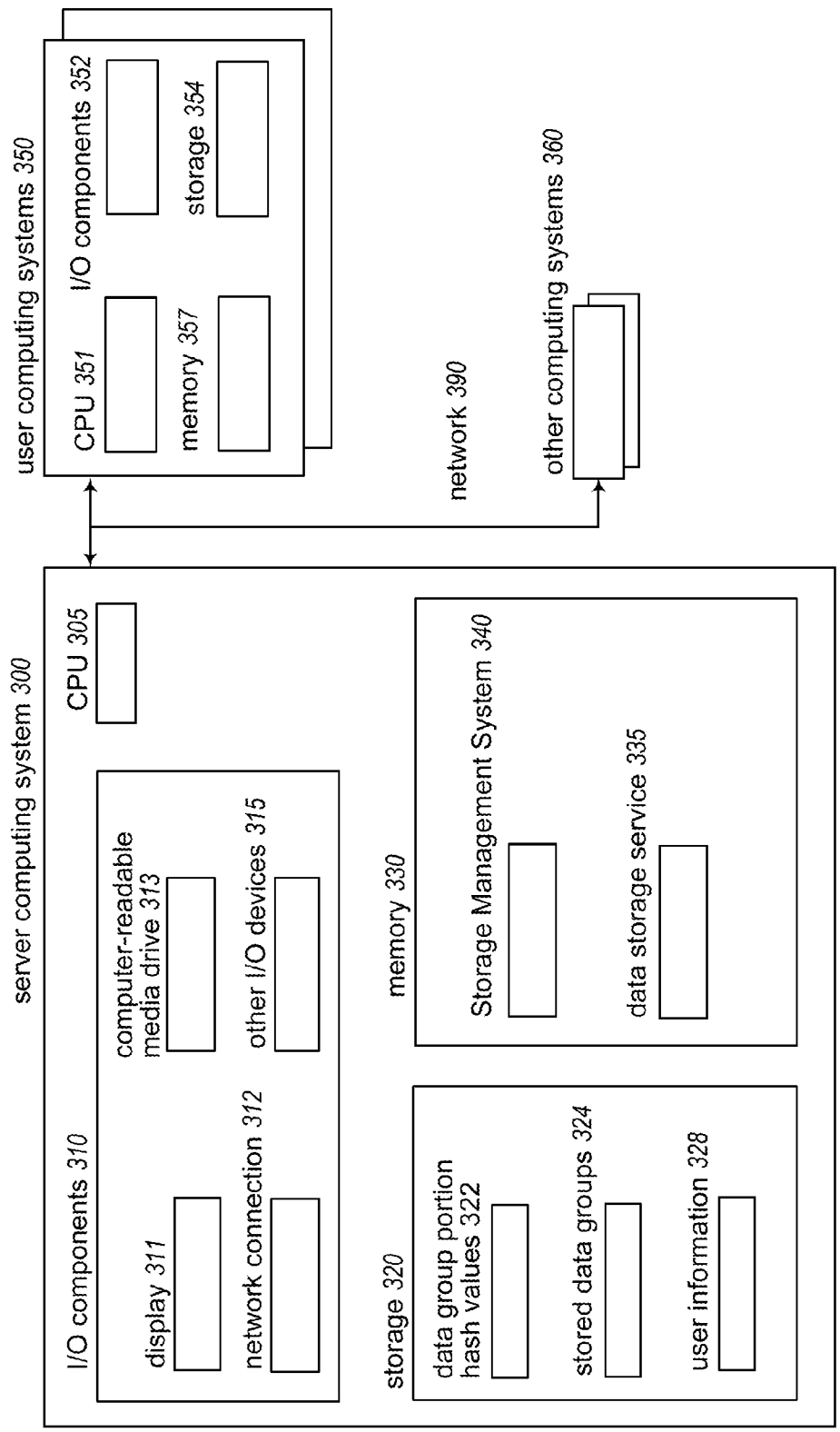
FIG. 3 is a block diagram illustrating an example embodiment of a computing system for managing data storage by reducing head and/or tail duplication in stored data.

FIG. 3 is a block diagram illustrating an example embodiment of a system suitable for performing techniques to manage the storage and retrieval of data groups in a distributed storage environment. In particular, FIG. 3 illustrates a server computing system 300 suitable for executing an embodiment of a Storage Management System 340, as well as various user computing systems 350 and other computing systems 360. In the illustrated embodiment, the server computing system 300 has components that include one or more CPU processors 305, various I/O components 310, storage 320, and memory 330, with the illustrated I/O components including a display 311, a network connection 312, a computer-readable media drive 313, and other I/O devices 315 (e.g., a keyboard, a mouse, speakers, etc.). In other embodiments, the server computing system 300 may have more or less components than are illustrated, and the storage 320 may optionally be provided by one or more non-volatile storage devices that are included within or otherwise locally attached to the server computing system 300. In addition, the illustrated user computing systems 350 have components similar to those of server computing system 300, including a CPU 351, I/O components 352 (although particular components are not illustrated), storage 354, and memory 357. The other computing systems 360 may also each include similar components to some or all of the components illustrated with respect to server computing system 300, but such components are not illustrated in this example for the sake of brevity.

An embodiment of a Storage Management System 340 is executing in memory 330, such as to include software instructions that, when executed by the CPU 305, program or otherwise configure the server computing system 300 to perform automated operations to provide some or all of the described techniques. In addition, a data storage service system 335 is executing in memory 335, optionally in affiliation with (or integrated with) the system 340, although in other embodiments the system 340 may interact with one or more remote data storage services over the network 390 (e.g., as executing on computing systems 360), or instead the system 340 may operate independently of any such data storage service (e.g., to manage storage and retrieval of data on a computing system on which it executes). The system 340 and/or data storage service 335 are further optionally configured to interact with computing systems 350 and/or 360 over the network 390 (e.g., via the Internet and/or the World Wide Web, via a private cellular network, etc.). In this example embodiment, the Storage Management System 340 includes functionality related to managing the storage and retrieval of a plurality of data groups on behalf of various users (not shown) interacting with user computing systems 350, such as when directed by the data storage service 335 via instructions from the users. The other computing systems 350 and 360 may be executing various software as part of interactions with the system 340 and/or data storage service 335. For example, user computing systems 350 may be executing a Web browser or other software in memory 357 to interact with system 340 and/or data storage service 335, such as to transfer particular data groups for storage and/or to request the retrieval of particular data groups already stored. In addition, one or more users of the user computing systems 350 may optionally interact with system 340 to perform various other types of actions, as discussed in greater detail elsewhere.

Various information related to the operation of the Storage Management System 340 and/or data storage service 335 may be stored in storage 320, such as data group portion hash values 322, the stored data groups 324 that are associated with those data group portion hash values, and user information 328. In addition, various intermediate state information and other information may be persistently stored in various manners, as discussed in greater detail elsewhere, including on storage 320 of server computing system 300, on user computing systems 350, or on other computing systems 360. Additional details regarding operations of the system 340 in particular embodiments are described in greater detail elsewhere.

It will be appreciated that systems 300, 350 and 360 are merely illustrative and are not intended to limit the scope of embodiments of the present disclosure. For example, system 340 may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a "client" or "server" server computing system or device may comprise any combination of hardware that can interact and perform the described types of functionality, optionally when programmed or otherwise configured by particular corresponding software instructions, including without limitation desktop or other fixed-location computers, laptops and tablets and other mobile computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated system 340 may in some embodiments be distributed in various modules.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the system 340) and/or data structures, such as by execution of software instructions of the one or more software programs and/or by storage of such software instructions and/or data structures. Furthermore, in some embodiments, some or all of the systems and/or modules may be implemented or provided in other manners, such as by using means (e.g., specialized electronics) that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on non-transitory computer-readable storage media, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
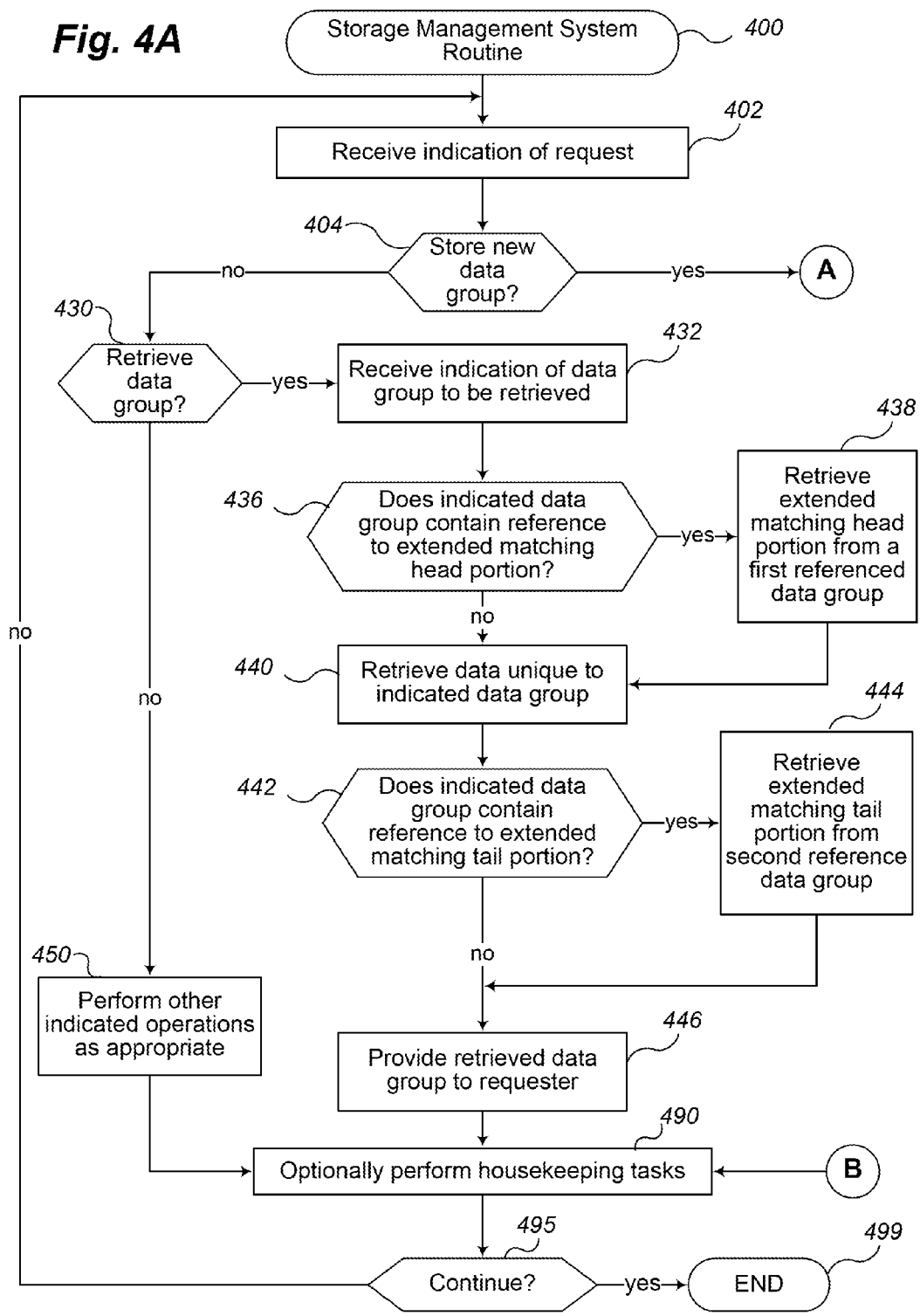
FIGS. 4A-4B illustrate a flow diagram for performing the storage and retrieval of one or more data groups by a storage management system that reduces head and/or tail duplication in stored data.
Figure 4B:
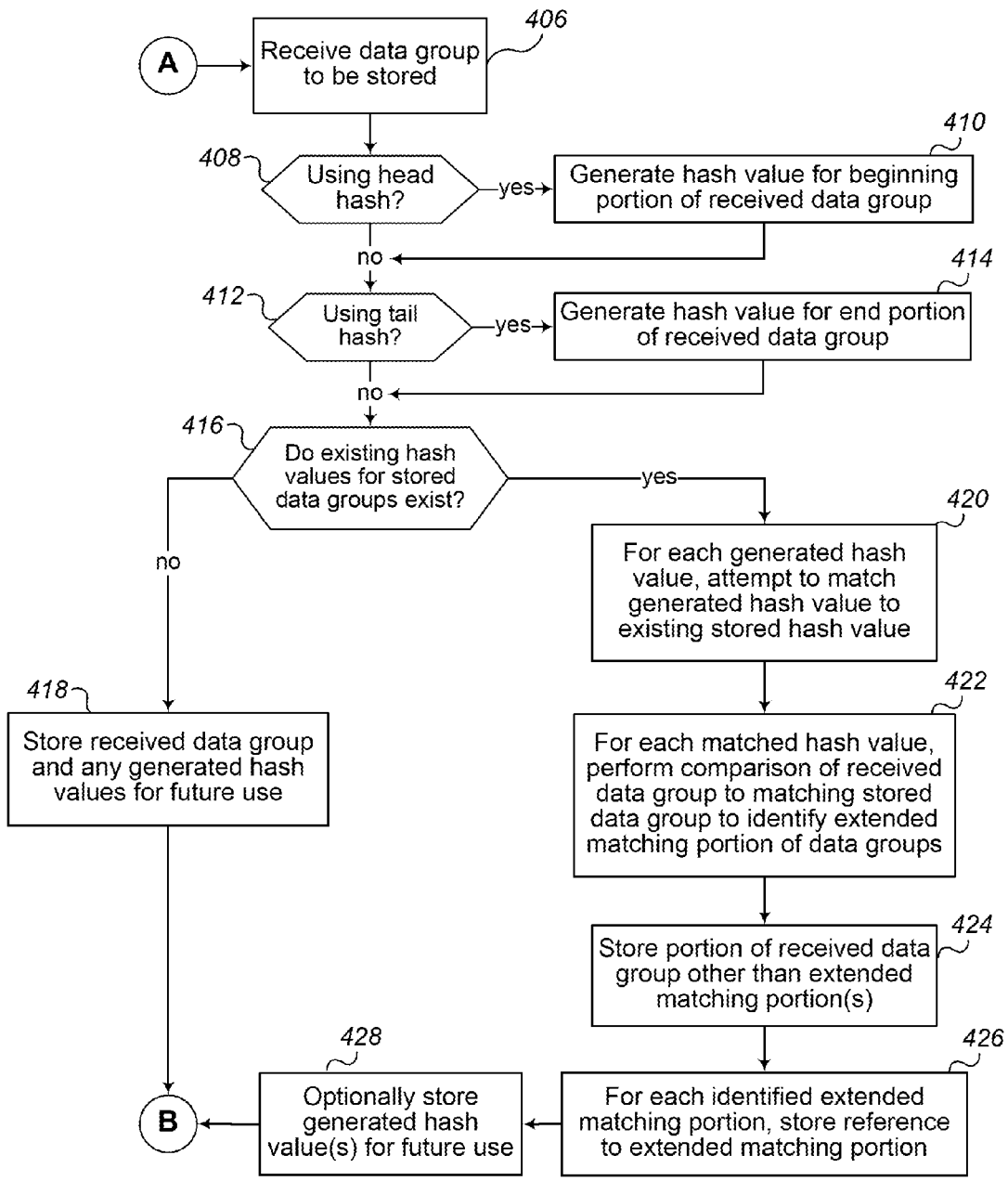

FIGS. 4A-4B are a flow diagram of an example embodiment of a Storage Management System routine 400. The routine may be provided, for example, by execution of the Storage Management System Manager module 115 of FIG. 1, and/or the Storage Management System 340 of FIG. 3, such as to manage the storage and retrieval of data groups, as well as to perform other types of actions in some situations. In this illustrated embodiment, the routine 400 manages various aspects of a storage management system, either alone or in conjunction with a data storage service (such as data storage service 125 of FIG. 1), that performs certain aspects of the storage and retrieval of data groups in a distributed storage environment.

In the illustrated embodiment, the routine begins at block 402 of FIG. 4A, where an indication of a request is received (e.g., from a data storage service, from a user, etc.). The routine continues to block 404 to determine whether the indicated request is to store a new data group.

Turning briefly to FIG. 4B, if the request is to store a new data group the routine continues to block 406, in which the data group to be stored is obtained, such as by being received in block 402, or instead being retrieved in block 406. Once the indicated data group is obtained, the routine continues to block 408 to determine if head hash matching is to be used, such as may be determined dynamically for each data group, or instead may be configured to be performed or not performed in a particular embodiment for all stored data groups. If head hash matching is to be used, the routine continues to block 410, in which a hash value for a beginning portion of the received data group (the head hash value) is generated. Once the head hash value has been generated, or if head hash matching is not to be used, the routine proceeds to block 412 to determine if tail hash matching is to be used, such as may be determined dynamically for each data group, or instead may be configured to be performed or not performed in a particular embodiment for all stored data groups. If tail hash matching is to be used, the routine continues to block 414, in which a hash value for an ending portion of the received data group (the tail hash value) is generated.

Once the tail hash value has been generated, or if tail hash matching is not to be used, the routine proceeds to block 416 to determine whether there are existing hash values for other existing stored data groups to which any hash values generated for the received data group in blocks 410 and/or 410 may be compared. If existing hash values for stored data groups are determined to exist, the routine proceeds to block 420 to attempt, for each generated hash value, to match the generated hash value for the received data block to an existing stored hash value corresponding to existing stored data groups (such as, for example, the stored data groups 324 in FIG. 3). As discussed elsewhere, in some embodiments, a new generated head hash value may be matched only to other head hash values, and a new generated tail hash value may be matched only to other tail hash values. The routine then proceeds to block 422 in which, for each generated hash value that has been matched to an existing hash value corresponding to an identified stored data group, if any, a comparison is performed between the received new data group and the identified existing stored data group to determine an extended matching portion of the two data groups.

Turning to block 424, the portion of the received new data group other than any determined extended matching portions is stored, such that the entire received data group is independently stored if no matching hash values are identified (or if no hash values were generated for the new data group in blocks 410 and 414). The routine next proceeds to block 426 in which, for each identified extended matching portion, if any, a reference to that extended matching portion is stored in association with the new data group. The routine then proceeds to block 428 in which, in some embodiments, any hash values that have been generated based on the received data block may optionally be stored for future use. For example, if both a head hash value and a tail hash value have been generated for the received data block, both generated values may be associated with the now-stored received data block and then stored for future match attempts, either in a single table or index or in separate tables or indexes for head hash values and tail hash values, respectively. Alternatively, in some embodiments, only new generated hash values that are not matched to any existing hash values are stored in block 428.

If it is instead determined in block 416 that no existing hash values exist for stored data groups, the routine then proceeds to block 418 in which the received data group is stored directly, and any generated hash values may optionally be stored for future match attempts, in a manner similar to that discussed with respect to block 428. For example, if the received data group is the first such data group received by the system, there may be no existing hash values for stored data groups.

If it is instead determined in block 404 that the indicated request was not to store a new data group, the routine proceeds to block 430 to determine whether the indicated request is to retrieve a data group already stored. If so, the routine proceeds to block 432, in which an indication is received of the particular data group to be retrieved. The routine then proceeds to block 436, in which it is determined whether the indicated data group contains a reference to an extended matching head portion. If so, the routine proceeds to block 438, in which contents of the extended matching head portion are retrieved from the referenced data group containing those contents. Once the contents of the extended matching head portion have been retrieved, or if it was determined that the indicated data group contains no reference to an extended matching head portion, the routine continues to block 440, in which the data unique to the indicated data group is retrieved. The routine then proceeds to block 442, in which it is determined whether the indicated data group contains a reference to an extended matching tail portion. If so, the routine proceeds to block 444, in which contents of the extended matching tail portion are retrieved from the referenced data group containing those contents. Once the contents of the extended matching tail portion have been retrieved, or if it was determined that the indicated data group contains no reference to an extended matching tail portion, the routine then proceeds to block 446, in which the requested data group is provided to the requester.

If it is instead determined in block 430 that the indicated request was not to retrieve a stored data group, the routine proceeds to block 450 to perform other indicated operations as appropriate. For example, the routine in block 450 may receive and respond to requests for particular existing generated hash values or to determine whether a supplied hash value matches any existing generated hash values, may analyze information about stored data groups to determine particular predetermined lengths to use for head hash value generation and/or tail hash value generation in particular situations (e.g., for particular types of content), etc.

After blocks 418, 428, 446 or 450, the routine continues to block 490 to optionally perform one or more other housekeeping tasks. Such other tasks may include, for example, automatically initiating one or more maintenance operations such as storage device defragmentation or memory garbage collection, either based upon a user or operator request or at a predetermined time. After block 490, the routine continues to block 495 to determine whether to continue, such as until an explicit indication to terminate is received (e.g., from an operator of the Storage Management System). If it is determined to continue, the routine returns to block 402, and if not continues to block 499 and ends.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable storage medium whose stored contents configure a computer system to perform a method, the method comprising:

generating, by the configured computing system, a first hash value for a first data group, the first hash value based on at least a first portion of data of a determined length within the first data group, the first data group including a first sequence of data that includes the first portion of data;

matching, by the configured computing system, the first hash value to one of a plurality of hash values that is based on a stored second portion of data of the determined length within a second data group of a plurality of data groups stored on one or more storage devices, the stored second data group including a stored second sequence of data that includes the stored second portion of data and that matches the first sequence of data of the first data group;

storing, by the configured computing system, a subset of the first data group on the one or more storage devices, the subset not including the first sequence of data; and storing, by the configured computing system, a reference for the first data group that is associated with the stored subset and with the stored second sequence of data for the second data group.

2. The non-transitory computer-readable storage medium of claim 1 wherein the stored contents further configure the computing system to, after the storing of the reference, retrieve the first data group from the one or more storage devices by:

retrieving the stored subset of the first data group from the one or more storage devices;

using the reference associated with the stored subset to retrieve the stored second sequence of data of the second data group;

providing a combination of the retrieved stored subset of the first data group and the retrieved stored second sequence of data of the second data group.

3. The non-transitory computer-readable storage medium of claim 1 wherein the stored contents further configure the computer system to, before the storing of the first data group, generate at least some of the plurality of hash values for the plurality of data groups.

4. The non-transitory computer-readable storage medium of claim 1 wherein the stored contents further configure the computer system to, before the generating of the at least some of the plurality of hash values for the plurality of data groups, determine one or more data lengths to use for the generating of the at least some of the plurality of hash values based at least in part on analyzing one or more stored data groups of the plurality of data groups.

5. The non-transitory computer-readable storage medium of claim 1 wherein the first portion of data is at a beginning of the first data group and the first hash value is a head hash value for the first data group, wherein the stored second portion of data is at a beginning of the second data group, and wherein the second hash value is a head hash value for the second data group.

6. The non-transitory computer-readable storage medium of claim 5 wherein the plurality of hash values that are based on the stored portions of the plurality of stored data groups include head hash values and tail hash values for each of at least some of the plurality of stored data groups, and wherein the stored contents further configure the computer system to dynamically determine, prior to the generating of the first hash value, whether to generate a head hash value for the first data group or a tail hash value for the first data group.

7. The non-transitory computer-readable storage medium of claim 1 wherein the first portion of data is at the end of the first data group and the first hash value is a tail hash value for the first data group, and wherein the stored second portion of data is at an end of the second data group and the one hash value to which the first hash value is matched is tail hash value for the second data group.

8. The non-transitory computer-readable storage medium of claim 1 wherein the stored contents further configure the computer system to generate multiple respective hash values for the first data group that include the first hash value, each of the generated respective hash values being based on a respective portion of data within the first data group having a respective length, and wherein the matching of the first hash value to the one of the plurality of hash values includes determining to attempt to match the respective hash value that is based on the respective portion of data having the greatest respective length prior to attempting to match the respective hash value that is based on the respective portion of data having the least respective length.

9. The non-transitory computer-readable storage medium of claim 1 wherein the stored contents further configure the computer system to identify the first and second sequences of data by comparing at least some of the first and second sequences of data to determine that the first and second sequences are identical.

10. The non-transitory computer-readable storage medium of claim 9 wherein the comparing of the at least some of the first and second sequences of data includes comparing at least a contiguous portion of the first data group that is adjacent to the first portion of data with at least a contiguous portion of the second data group that is adjacent to the second portion of data.

11. The non-transitory computer-readable storage medium of claim 9 wherein the comparing of the at least some of the first and second sequences of data includes comparing cryptographic hash values that are each based on portions of the first sequence of data having a distinct respective length to cryptographic hash values that are each based on portions of the second sequence of data having the distinct respective length.

12. The non-transitory computer-readable storage medium of claim 1 wherein the first hash value and the plurality of hash values are cryptographic fingerprints that uniquely correspond to data from which the cryptographic fingerprints are generated.

13. The non-transitory computer-readable storage medium of claim 1 wherein the plurality of hash values are stored in a lookup table, and wherein matching the first hash value to the one hash value includes accessing the lookup table.

14. The non-transitory computer-readable storage medium of claim 1 wherein the stored contents further configure the computer system to, prior to generating the first hash value, dynamically determine a length of the first portion of data based at least in part on a type of contents of the first data group and/or a length of the first data group.

15. The non-transitory computer-readable storage medium of claim 1 wherein at least one of the generating of the first hash value and the matching of the first hash value is performed prior to receiving all data for the first data group.

16. The non-transitory computer-readable storage medium of claim 1 wherein the stored contents further configure the computer system to:
generate a second hash value for a third data group, the second hash value being based on at least a third portion of data of the determined length within the third data group;
determine that the third hash value does not match any of the plurality of hash values;
store the third data group on the one or more storage devices; and
store the second hash value with the plurality of hash values for use in subsequent matching to other generated hash values.

17. A computer-implemented method comprising:
generating, by one or more configured computing systems, a first identifier for a first data group based on a first portion of data within the first data group, the first data group including a first sequence of data;
matching, by the one or more configured computing systems, the first identifier to a second identifier that is based on a second portion of data for a stored second data group, the stored second data group including a stored second sequence of data that matches the first sequence of data;
storing, by the one or more configured computing systems, a subset of the first data group, the subset not including the first sequence of data; and
storing, by the one or more configured computing systems, a reference for the first data group that is associated with the stored subset and with the stored second sequence of data for the second data group.

18. The computer-implemented method of claim 13, further comprising retrieving the first data group by, based at least in part on the stored reference for the first data group, retrieving and combining the stored subset of the first data group and the stored second sequence of data for the second data group.

19. The computer-implemented method of claim 17 further comprising, prior to the generating of the first identifier for the first data group, generating the second identifier for the second data group.

20. The computer-implemented method of claim 17 wherein the first portion of data is at the beginning of the first data group and the first identifier is a head hash value for the first data group, and wherein the second portion of data is at a beginning of the second data group and the second identifier is a head hash value for the second data group.

21. The computer-implemented method of claim 17 wherein the first portion of data is at the end of the first data group and the first identifier is a tail hash value for the first data group, and wherein the second portion of data is at an end of the second data group and the second identifier is a tail hash value for the second data group.

22. The computer-implemented method of claim 17 wherein the first portion of data has a position within the first data group and a length, and wherein the generating of the first identifier based on the first portion of data includes dynamically determining at least one of the length of the first portion of data and the position of the first portion of data.

23. The computer-implemented method of claim 22 wherein the storing of the subset of the first data group includes storing the subset on one or more storage devices of a network-accessible storage service that stores the second data group, and wherein the dynamically determining is based at least in part on one or more available resources of the network-accessible storage service.

24. The computer-implemented method of claim 22 wherein the dynamically determining is based at least in part on one or more configuration parameters specified by one or more users associated with one or more of the first data group and the second data group.

25. The computer-implemented method of claim 22 wherein the dynamically determining is based at least in part on an identified type of content associated with the first data group.

26. The computer-implemented method of claim 25 wherein the identified type of content associated with the first data group is media content, and wherein the dynamically determining includes determining that the position of the first portion of data within the first data group is an end of the first data group.

27. The computer-implemented method of claim 25 wherein the identified type of content associated with the first data group is textual content.

28. The computer-implemented method of claim 22 wherein the method further comprises receiving the first data group by the one or more configured computing systems, and wherein the dynamically determining is based at least in part on a manner in which the first data group is received.

29. The computer-implemented method of claim 28 wherein the first data group is received by the one or more configured computing systems as streamed data, and wherein the dynamically determining includes determining that the position of the first portion of data within the first data group is a beginning of the first data group.

30. The computer-implemented method of claim 17 wherein the method further comprises receiving the first data group by the one or more configured computing systems as streamed data, and wherein at least one of the generating of the first identifier and the matching of the first identifier to the second identifier is performed prior to receiving all of the streamed data for the first data group.

31. The computer-implemented method of claim 17 wherein the stored second data group is one of a plurality of distinct stored data groups, wherein each distinct stored data group within the plurality of stored data groups is associated with a distinct identifier, and wherein the method further comprises:
  generating a third identifier for a third data group, the third identifier being based on a third portion of data within the third data group;
  determining that the third identifier does not match any of the identifiers associated with the plurality of distinct stored data groups;
  storing the third data group as part of the plurality of distinct data groups; and
  associating the third identifier with the stored third data group for use in subsequent matching to other generated identifiers.

32. A system, comprising:
one or more processors; and
a memory coupled to the one or more processors, the memory including instructions that, when executed by at least one of the one or more processors, cause the system to:
  generate a first hash value for a first data group based on a first portion of data within the first data group;
  match the first hash value to a second hash value that is based on a stored second portion of data of a second data group, the second data group including a stored data sequence that matches a first data sequence of the first data group, wherein the stored data sequence of the second data group includes the stored second portion of data and wherein the first data sequence of the first data group includes the first portion of data;
  store a subset of the first data group, the subset not including the first data sequence; and
  store a reference for the first data group that is associated with the stored subset and with the stored data sequence of the second data group.

33. The system of claim 32 further comprising one or more storage devices, wherein the instructions when executed cause the system to store the subset and the reference on the one or more storage devices.

34. The system of claim 32 wherein the memory further includes instructions that when executed cause the system to retrieve the first data group by retrieving and combining the stored subset of the first data group and the stored second sequence of data for the second data group.

* * * * *